US007767741B2

(12) United States Patent
Nylander et al.

(10) Patent No.: US 7,767,741 B2
(45) Date of Patent: Aug. 3, 2010

(54) SEMICONDUCTIVE POLYMER COMPOSITIONS

(75) Inventors: Perry Nylander, Gothenburg (SE); Alfred Campus, Eysins (CH); Annika Smedberg, Myggenas (SE); Karl-Michael Jäger, Gothenburg (SE); Ulf Nillson, Stenungsund (SE); Hans Eklind, Stenungsund (SE); Claes Broman, Odsmal (SE); Wilfried Kalkner, Berlin (DE); Marc Brüggemann, Berlin (DE)

(73) Assignee: Borealis Technology Oy, Porvoo (FI)

( * ) Notice: Subject to any disclaimer, the term of this patent is extended or adjusted under 35 U.S.C. 154(b) by 27 days.

(21) Appl. No.: 11/572,475

(22) PCT Filed: Jun. 21, 2005

(86) PCT No.: PCT/EP2005/006709

§ 371 (c)(1), (2), (4) Date: Sep. 20, 2007

(87) PCT Pub. No.: WO2006/007927

PCT Pub. Date: Jan. 26, 2006

(65) Prior Publication Data

US 2008/0157028 A1 Jul. 3, 2008

(30) Foreign Application Priority Data

Jul. 22, 2004 (EP) .................................. 04017391

(51) Int. Cl.
*C08K 5/00* (2006.01)
*H01B 1/06* (2006.01)

(52) U.S. Cl. ....................................... 524/236; 252/511

(58) Field of Classification Search .................. 524/236
See application file for complete search history.

(56) References Cited

U.S. PATENT DOCUMENTS 5,076,967 A * 12/1991 Tojo et al. ................... 252/511
5,352,289 A * 10/1994 Weaver et al. ............... 106/476

FOREIGN PATENT DOCUMENTS

JP 10312717 11/1998
WO WO 94/14900 7/1994

OTHER PUBLICATIONS

Translation of JP 10-312717, Nov. 1998.*
Roy et al., Journal of Materials Science, 31, 5313-5319, 1996.*
Abstract Only of Japanese Publication No. 09052985, Published Feb. 25, 1997; Applicant: Yazaki Corp.; Title: Composition for Semiconducting Layer of Power Cable.

* cited by examiner

*Primary Examiner*—Ling-Siu Choi
*Assistant Examiner*—Hui Chin
(74) *Attorney, Agent, or Firm*—Roberts Mlotkowski Safran & Cole, P.C.

(57) ABSTRACT

The present invention relates to a semiconductive polymer composition comprising an olefin homo- or copolymer wherein the composition has a direct current volume resistivity of less than 1000 Ohm·cm at 90° C., an elongation at break which after aging for 240 hours at 135° C. does not change by more than 25%, and a total number of structures of 20 or less in the SIED test. Furthermore, the present invention relates to an electric power cable comprising a conductor, a semiconducting layer and, adjacent to the semiconducting layer, an insulation layer, wherein the semiconducting layer is formed by said semiconductive polymer composition and to the use of said semiconducting polymer composition for the production of a semiconductive layer of an electric power cable.

21 Claims, No Drawings

SEMICONDUCTIVE POLYMER COMPOSITIONS

The present invention relates to a semiconductive polymer, in particular polyolefin, composition with an improved Stress Induced Electrochemical Degradation (SIED) behaviour. Furthermore, the invention relates to an electric power cable comprising the semiconductive composition and to the use of the semiconductive composition for the production of a semiconductive layer of an electric power cable.

Electric power cables, in particular for medium voltage (≧6 kV to <36 kV) and high voltage (≧36 kV), usually comprise a conductive cable core surrounded by an inner semiconductive layer, an insulation layer, an outer semiconductive layer and, optionally, further barrier layers and a cable jacket. Today, the insulation and semiconductive layers usually are made from polymers, in particular polyolefins. Predominantly, ethylene homo- and/or copolymers are used which usually are crosslinked, e.g. by adding peroxide to the composition before extrusion.

Power cables comprising polymeric insulation and/or semiconducting layers are known to suffer from a reduced service life span when installed in an environment where the cable is exposed to water, as e.g. in underground or high humidity locations, when compared to cables installed in dry environment. The reduced service life span has been attributed to the formation of dendritically branched defects, so called water trees, which occur when an organic polymer material is subjected to an electric field over a longer period of time in the presence of water.

Water trees, i.e. bow-tie and vented trees, can develop in the presence of water and an electric field. Normally bow-tie trees are initiated at contaminants present within the insulation layer while vented trees are initiated at particles or protrusions at the interface between the semiconductive and the insulation layer. The growth of vented trees is additionally promoted by the presence of sulphur in the semicon. The increased field strength or a weakened insulation at the tip of the water tree may initiate electrical treeing leading to an electrical breakdown of the insulation system. The extensive work on the water tree phenomenon has resulted in improvements in design, manufacture, materials, testing and qualification; these have reduced the impact of water treeing in modern cable systems. To characterize the resistance of cables to electrical degradation due to water treeing, a series of tests have been developed and are widely used in the industry to type test new cable constructions and monitor the quality of regular production. For development purposes, a test using model cables, has been found to correlate well with the performance of industrial cables tested according to industry recommendations. Regarding the semiconductive layer it is particularly sensitive to water trees initiated at particle and protrusion defects. This model cable test is described in detail in the examples section below.

Within the extensive research and development work it has been reported that occasionally vented trees can initiate from an apparently undisturbed semicon/insulation interface. This has been explained as resulting from the presence of porous-like structures in the semicon layer which can initiate relatively large vented trees.

These defect structures are believed to be generated via an electrochemical reaction between aluminium and the semiconductive material under the influence of mechanical stress in the presence of an electrolyte. This involves the inner semiconductive layer in contact with an aluminium conductor or the outer semiconductive layer in contact with e.g. aluminium wires leading fault currents.

Clearly, during the life-time of a medium or high voltage cable these defect structures may be generated under the influence of electrical and mechanical stress in presence of water. They continue to grow and if eventually reaching the semicon/insulation interface may initiate vented trees. This ageing mechanism is referred to as Stress Induced Electrochemical Degradation (SIED) and the resulting defect structures have been designated as “SIED structures”, “ion tracks” or “black trees”.

An increased number of vented trees due to SIED can lead to an increased probability of electrical failure of the cable. In order to ensure reliable functioning of the cable at a given electrical stress the insulation layer thickness is adjusted according to the probability of electrical failure.

In order to avoid electric failure of power cables originating from the water trees growing from semiconductive layer of the cable it is an object of the present invention to provide a polymer composition for use as a semiconductive layer in a power cable in which the number of initiatory defects structures is minimized. At the same time the polymer composition does not jeopardize the water treeing properties as measured in the “Modelcable test”.

The problem of water trees and possible solutions to it are, for example, discussed in WO 98/34236.

It is known that certain additives must be used in a semiconductive composition, such as a conductive agent (usually carbon black) and an antioxidant, in order to ensure sufficient conductivity and satisfactory thermo-oxidative protection of the cable layer produced from it. It has now been found that the number of defect structures in the semiconducting layer is dependent on the specific nature of the additives.

The present invention provides a semiconductive polymer composition with a direct current volume resistivity of less than 1000 Ohm·cm at 90° C., with an elongation at break which after aging for 240 hours at 135° C. does not change by more than 25%, and which composition has a total number of structures of 20 or less in the SIED test.

The semiconductive composition according to the invention shows a reduced number of defect structures when extruded as a semiconductive layer of a power cable in the Stress Induced Electrochemical Degradation (SIED) test. This test is described in detail in the examples section below.

The inventive composition allows for the production of power cables with an enhanced reliability as to electrical failure. Thus, the composition allows the cable to withstand higher stresses and/or allows for the production of cables with a reduced insulation layer thickness and/or with an increased operating voltage.

It has been found that the number of defect structures in the semiconducting layer is dependent on the specific nature of the additives and their combination.

The composition usually comprises a conductive additive, preferably carbon black. The amount of carbon black to be added is determined by the volume resistivity to be reached and also depends on the selected type of carbon black.

Preferably, the composition comprises carbon black in an amount of from 10 to 40 wt.-%, more preferably from 10 to 30 wt.-%.

It is further preferred that the composition comprises carbon black with an $L_c$ in the range of from 1.8 to 2.4 nm. It has surprisingly been found that an enhanced SIED performance can be achieved using carbon black having an $L_c$ value within the above stated range also when using a carbon black with a low surface area.

The spherical Carbon black primary particle is composed of small crystallites which are made up of parallel layers with the same atomic positions as graphite within the layers. The carbon black microstructure can be defined by its crystallite dimensions as measured by X-ray diffraction. Accordingly, $L_c$ represents a measure of the average stacking heights of the layers and $L_a$ is indicative of their average diameter.

The crystallite dimensions, and particularly $L_c$, are largely depended on the manufacturing process. For instance, furnace blacks generally range between 1.1 to 1.7 nm. Acetylene blacks exhibit notably higher $L_c$ values relative to all other carbons.

Since the surface energy of carbon black is a function of $L_c$ (M-J. Wang & S. Wolff "Surface Energy of Carbon Black") it is believed that the crystallite dimensions do indeed have an important impact on the carbon black polymer interfacial properties and thus on the final properties of the semiconductive compound.

Carbon black having $L_c$ in the range of from 1.8 to 2.4 nm may be obtained e.g. by the MMM-process, which is described, for example, in N. Probst, E. Grivei, C. van Belling "Acetylene Black or other conductive carbon blacks in HV cable compounds. A historical fact or a technological requirement?" in Proceedings of the 6$^{th}$ International Conference on Insulated Power Cables, pages 777, Versailles/France, Jun. 22 to 26, 2003, and L. Fulcheri, N. Probst, G. Flamant, F. Fabry and E. Grivei "Plasma Processing: A step towards the production of new grades of carbon black" in Proceedings of the Third International Conference on Carbon Black, page 11, Mulhouse/France, Oct. 25 to 26, 2000.

Furthermore, it has been found that the number of defect structures decreases with increasing surface area of the carbon black used as measured in the iodine absorption test.

Accordingly, the composition preferably comprises carbon black with a iodine number of 75 mg/g or higher, if carbon black with an $L_c$ of from 1.8 to 2.4 nm is used, and preferably of 100 mg/g or higher, more preferably 140 mg/g or higher, still more preferably 200 mg/g or higher, and most preferably of 300 mg/g or higher if carbon black with other $L_c$ is used.

Preferably, the carbon black used contains less than 1000 ppm sulphur, more preferably contains less than 500 ppm sulphur.

It has further been found that in principle the number of defect structures can be reduced by reducing the amount of antioxidant in the composition. However, for achieving satisfactory ageing properties, it is usually indispensable for the polymer composition to comprise an antioxidant. An antioxidant commonly used is, for example, poly-2,2,4-trimethyl-1,2-dihydroquinoline (TMQ).

Typically, the antioxidant is present in an amount of from 0.1 to 2 wt.-%, preferably from 0.2 to 1.2 wt.-%.

Preferably, the antioxidant is selected from the group of diphenyl amines and diphenyl sulfides. The phenyl substituents of these compounds may be substituted with further groups such as alkyl, alkylaryl, arylalkyl or hydroxy groups.

Preferably, the phenyl groups of diphenyl amines and diphenyl sulfides are substituted with tert.-butyl groups, preferably in meta or para position, which may bear further substituents such as phenyl groups.

More preferred, the antioxidant is selected from the group of 4,4'-bis(1,1'dimethylbenzyl)diphenylamine, para-oriented styrenated diphenyl-amines, 6,6'-di-tert.-butyl-2,2'-thiodi-p-cresol, and tris(2-tert.-butyl-4-thio-(2'-methyl-4'-hydroxy-5'-tert.-butyl)phenyl-5-methyl)phenylphosphite or derivatives thereof.

Of course, not only one of the above described antioxidant may be used but also any mixture thereof.

It has furthermore been found that the number of defect structures in the semiconducting layer may be reduced by adding a compound comprising polypropylene oxy groups, such as polypropylene glycol. Polypropylene oxy groups may also be present in block copolymers with up to 70 wt.-% polyethylene oxy groups.

The polyolefin of the composition of the present invention may be an olefin homo- or copolymer. It may be made by any process known in the art, preferably by a high pressure process.

Preferably, the polyolefin has a density of less than 935 kg/m$^3$.

It is preferred that the polyolefin comprises an ethylene polymer, i.e. ethylene homo- or copolymer, e.g. including ethylene/propylene rubber.

Further preferred, the polyolefin of the composition comprises monomer units with polar groups or the composition further comprises a polymer with monomer units comprising polar groups.

Preferably, the monomer units with polar groups are selected from the group of alkyl acrylates, alkyl metacrylates, acrylic acids, metacrylic acids and vinyl acetates.

Further preferred, the monomers units are selected from $C_1$- to $C_6$-alkyl acrylates, $C_1$- to $C_6$-alkyl metacrylates, acrylic acids, metacrylic acids and vinyl acetate.

Still more preferably, the polyolefin of the composition comprises a copolymer of ethylene with $C_1$- to $C_4$-alkyl, such as methyl, ethyl, propyl or butyl acrylates or vinyl acetate.

The polar monomer units may also contain ionomeric structures (as in e.g. Dupont's Surlyn types).

It is preferred that the amount of monomer units with polar groups with regard to the total amount of monomers in the polymeric part of the composition is from 1 to 15 mol %, more preferably from 2 to 10 mol % and most preferably from 2 to 5 mol %.

The polar monomer units may be incorporated by copolymerization of e.g. olefin monomers with polar comonomers. This may also be achieved by grafting of polar monomers units e.g. onto a polyolefin backbone.

Preferably, the composition has an $MFR_{21}$ measured in accordance with ISO 1133 under a load of 21.6 kg at a temperature of 190° C. of more than 25 g/10 min.

Still further, the composition has an electrical breakdown strength as measured in the model cable test of at least 29 kV/mm, more preferred at least 35 kV/mm, and still more preferred of at least 37 kV/mm.

The thermal and mechanical stability of polymers can be enhanced by crosslinking. It is, thus, preferred that the composition is crosslinkable which may, e.g. mean that a crosslinking agent is added to the composition or that crosslinkable groups, e.g. silane groups, are present in the polyolefin of the composition, and, if needed, a crosslinking catalyst is added to the composition.

Preferably, the composition comprises a peroxide as a crosslinking agent, preferably in an amount of from 0.1 to 2 wt.-%.

Where crosslinkable silane groups are present in the polyolefin of the composition, it is preferred that an hydrocarbyl substituted aromatic sulphonic acid or a precursor thereof is added to the composition as a silanol condensation catalyst.

The present invention also pertains to an electric power cable comprising a semiconducting layer formed by the semiconducting composition as described above.

Usually, semiconducting layers are contained in medium to high voltage cables, in which a conductor core, e.g. copper or aluminum, is surrounded by an inner semiconducting layer, an insulation layer, and an outer semiconducting layer. Optionally, further shielding layers and/or a cable jacket may be present.

Preferably, at least the innermost semiconductive layer of a power cable is formed by the composition as described above.

Finally, the present invention relates to the use of a semi-conducting polymer composition as described above for the production of a semiconductive layer of an electric power cable, preferably a medium to high voltage electric power cable.

The present invention will be further illustrated by means of the following examples.

EXAMPLES

1) Definition of Measurement Methods a) Stress Induced Electrochemical Degradation (SIED)

The SIED is measured in close accordance with the method described in K. Steinfeld et at., "Stress Induced Electrochemical Degradation of the Inner Semicon Layer", IEEE Transactions on Dielectrics and Electrical Insulation, vol. 5 no. 5, 1998:

The samples used are sandwich-type slabs consisting of conductor wires with a radius of 1.5 mm, semiconductive layer and insulation. The wires are taken from the aluminium conductor of a medium voltage cable, the insulation layer is formed of LDPE ($MFR_2$=2 g/10 min) containing 2 wt.-% of DCP and 0.2 wt.-% of 4,4'-thiobis(2-tert.-butyl-5-methylphenol), and the semi-conductive layer are made of the semiconductive material to be tested (e.g. as described below). The samples are produced by means of a heatable laboratory press equipped with appropriate ring-shaped molds.

The thickness of the semiconductive layer in the sandwich-type slab is 1 mm, which is to be measured as shortest distance of the wires to the insulation layer.

During the manufacture of the samples, precautions must be taken against the occurrence of contaminant particles and granule boundaries in the insulation which may lead to water treeing. By working in an extra clean environment and appropriate handling of both the raw materials and the semifinished products, contamination of the insulation and the interface to the semiconducting layers must be limited to a negligible degree. Granule boundaries can be avoided by choosing manufacturing parameters which lead to an intensive flow of material in the mold. The measures must result in samples in which apart from vented trees initiated by SIED hardly any additional water treeing can be observed.

The samples are conditioned at 70° C. for 120 h to remove crosslinking by-products. The samples are then heated to 130° C. and then quenched with tap water from the insulation side.

The samples are mounted into an ageing cell, such as described in FIG. 2 of K. Steinfeld et at., "Stress Induced Electrochemical Degradation of the Inner Semicon Layer", IEEE Transactions on Dielectrics and Electrical Insulation, vol. 5 no. 5, 1998, on page 775. The sample is permanently deformed from the conductor side resulting in a bend and thus having mechanical strain of semicon and insulation of the sample during ageing. The liquid tank on the insulation side contained demineralized water. On the conductor side a sodium chloride solution containing a small amount of a surfactant is used. Both liquids can be heated and cooled enabling temperature cycling.

The ageing conditions to be applied are the following:

| | |
|---|---|
| Test duration: | 1000 h |
| Electrical Field Strength: | 5 kV/mm (50 Hz, rms) |
| Temperature: | isothermal 50° C. |
| Electrolyte: | aqueous NaCl solution 0.1 mol/l, surfactant 0.01% |
| Strain (elongation) | 4% |

After aging, the different model samples were cut into two halves, the aluminium wires were removed and one half stained in a methylene blue dye solution. Following the staining procedure, 20 slices of 500 micrometer were microtomed perpendicular to the slab surface and microscopically observed for structures in the semiconductive layer and possible vented trees in the insulation initiated by the structures. The defect structures in the semiconducting layer were then counted in the direction parallel to the semiconducting layer. The results were reported as number of structures with and without vented trees per mm.

b) Test of Tensile Properties after Ageing

The elongation at break has been measured in accordance with IEC 60811-1-2 after 0 hours and after ageing for 240 hours at 135° C. The materials showing a change of 25% or below are considered to have "passed" this test.

c) Volume Resistivity

The direct current (DC) volume resistivity has been measured at 90° C. in accordance with ISO 3915.

d) $L_c$ Value for Carbon Black $L_c$ values are determined by powder X-ray diffraction as e.g. described in W. M. Hess, C. R. Herd, "Microstructure, Morphology and General Physical Properties" in "Carbon Black—Science and Technology" $2^{nd}$ edition, ed. by J. P. Donnet, R. C. Bansal and M.-J. Wang, Marcel Dekker, N.Y. 1993.

e) Carbon Black Surface Area

The surface area of carbon black is characterized in the iodine test wherein the iodine number is determined, in accordance with ASTM D-1510. The unit is mg/g.

f) Dielectric Strength in Model Cable Test

The testing of the dielectric strength was carried out on these test cables in accordance with a method developed by Alcatel AG & Co, Hannover, Germany, and described in an article by Land H. G., Schädlich Hans, "Model Cable Test for Evaluating the Ageing Behaviour under Water Influence of Compounds for Medium Voltage Cables", Conference Proceedings of J1cable 91, Jun. 24 to 28, 1991, Versaille, France.

The example compounds have been used as inner semiconductive layer. The insulation and outer semiconductive material used was an insulation material based on LDPE ($MFR_2$=2 g/10 min) containing 2 wt.-% DCP and 0.2 wt.-% of 4,4'-thiobis(2-tert.-butyl-5-methylphenol), and composition C2 (see Table 1), respectively.

The AC dielectric strength was measured after ageing for 1000 h at 9 kV/mm in 70° C. water.

A voltage ramp of 100 kV/min was used in the breakdown test.

The investigated length of the active part of the cable, i.e. with outer semiconductive layer, was 50 cm.

The Weibull 63% values of the breakdown strengths $E_{max}$ in kV/mm are reported in this text.

2) Production of Samples and Results

Several compositions have been prepared by using as basic polyolefin the following ethylene copolymers with polar monomer units:

poly(ethylene methylacrylate) with 4.6 mol % methylacrylate monomer units in Composition 1 poly(ethylene butylacrylate) with 4.3 mol % butylacrylate monomer units, $MFR_{2/190}$ (measured at a temperature of 190° C. and a load of 2.16 kg in accordance with ISO 1133) of 7, in Compositions 2 to 12 and 13 to 15, and comparative Compositions C1 to C4, poly(ethylene methylacrylate) with 2.75 mol % methylacrylate monomer units in comparative Composition C5.

4,6-bis(octylthiomethyl)-o-cresol (BOC), CAS 110553-27-0

N,N'-bis(3(3',5'-di-tert.-butyl-4'-hydroxyphenyl)propionyl)hydrazide (NPH), CAS 32687-78-8

N,N'-hexamethylene bis(3,5-di-tert.-butyl-4-hydroxy-hydrocinnamide (NHC), CAS 23128-74-7

PPG1: polypropyleneglycol, average molecular weight: about 4000 g/mol

PPG2: polypropyleneglycol block copolymerised with 50% polyethyleneglycol, average molecular weight of polypropylene blocks is about 3250 g/mol PPG3: polypropyleneglycol, average molecular weight: about 2000 g/mol As peroxides, di(tert.-butylperoxy)di-isopropylbenzene (DBIB) or dicumylperoxide (DCP) have been used.

TABLE 1

| | Carbon Black | | | Antioxidant/ Stabilizer | | Peroxide | | Number of Structures in SIED test [no./mm] | | | Diff. in Elong. | Vol. Resistivity | Elec. brd. |
|---|---|---|---|---|---|---|---|---|---|---|---|---|---|
| Comp. No. | wt % | $L_c$ [nm] | Iodine no. | type | wt % | type | wt % | with trees | without trees | total | at break after 10 days <25% | [Ohm cm] at 90° C. | strength [kV/mm] |
| 1 | 29.5 | 1.9 | 80 | TMQ | 1.0 | DCP | 1.2 | 0 | 8 | 8 | pass | 180 | 44.8 |
| 2 | 24.0 | 1.9 | 80 | TMQ | 0.9 | DBIB | 1.26 | 0 | 14 | 14 | pass | 890 | |
| 3 | 27.0 | 1.9 | 80 | TMQ | 0.9 | DBIB | 1.2 | 2 | 10 | 12 | pass | | |
| 4 | 39.7 | | 350 | TMQ | 0.9 | DBIB | 1 | 3.5 | 8 | 11.5 | pass | | |
| 5 | 12 | | 920 | TMQ | 0.9 | DBIB | 1 | 0 | 0 | 0 | pass | | |
| 6 | 18.0 | | 790 | TMQ | 0.9 | DBIB | 1 | 0 | 0 | 0 | pass | | |
| C1 | 37.0 | 3.9 | 95 | TMQ | 0.65 | DBIB | 1.0 | 13 | 22 | 35 | pass | 570 | |
| 7 | 39.4 | 1.5-1.7 | 160 | N445 | 1.0 | DBIB | 1.0 | 1 | 11 | 12 | pass | | |
| 8 | 39.0 | 1.5-1.7 | 160 | DTC<br>NPH | 0.1<br>0.2 | DBIB | 1.0 | 0.5 | 10.5 | 11 | pass | | 40.4 |
| 9 | 39.0 | 1.5-1.7 | 160 | SDA | 0.4 | DBIB | 1.0 | 0.5 | 5.5 | 6 | pass | | |
| 10 | 39.4 | 1.5-1.7 | 160 | TTP | 0.3 | — | 0.0 | 0.5 | 4 | 4.5 | pass | | 34.8 |
| 11 | 39.4 | 1.5-1.7 | 160 | DMP | 0.3 | — | 0.0 | 0 | 3 | 3 | pass | | 39.9 |
| 12 | 39.4 | 1.5-1.7 | 160 | DTC | 0.4 | — | 0.0 | 0.5 | 4 | 4.5 | pass | | 47.4 |
| C2 | 39.6 | 1.5-1.7 | 160 | TMQ | 0.9 | DBIB | 1.0 | 13 | 32 | 45 | pass | 740 | 44.4 |
| C3 | 39.4 | 1.5-1.7 | 160 | BOC<br>NPH | 0.2<br>0.2 | — | 0.0 | 48.5 | 500 | 548.5 | pass | | |
| C4 | 39.4 | 1.5-1.7 | 160 | NHC | 0.3 | — | 0.0 | 1 | 31 | 32 | pass | | |
| C5 | 33 | 1.0 to 1.7 | 80 | TMQ | 0.8 | DBIB | 0.8 | 13 | 20 | 33 | pass | | |
| 13 | 37.5 | 1.5-1.7 | 160 | TMQ/ PPG1 | 0.7/0.3 | DBIB | 1 | 1 | 1 | 4 | pass | | 42.2 |
| 14 | 37.5 | 1.5-1.7 | 160 | TMQ/ PPG2 | 0.7/0.4 | DBIB | 1 | 1 | 1.5 | 7 | pass | | 29.4 |
| 15 | 37 | 1.5-1.7 | 160 | TMQ/ PPG3 | 0.9/0.4 | — | 0 | 0 | 2 | 4.5 | pass | | |

To the polar copolymer, the amounts and types of carbon black, antioxidant and peroxide as indicated in Table 1 have been added.

Carbon black in samples 7 to 12 and comparative samples C2 to C4 was furnace carbon black.

As antioxidants/stabiliser, the following compounds have been used:

poly-2,2,4-trimethyl-1,2-dihydroquinoline (TMQ), CAS 26780-96-1

4,4'-bis(1,1'dimethylbenzyl)diphenylamine (DMP), CAS 10081-67-1 para-oriented styrenated diphenylamines (SDA), CAS 68442-68-2

6,6'-di-tert.-butyl-2,2'-thiodi-p-cresol (DTC), CAS 90-66-4 tris(2-tert.-butyl-4-thio(2'-methyl-4'-hydroxy-5'-tert.-butyl)phenyl-5-methyl)phenylphosphite (TTP), CAS 36339-47-6

The invention claimed is:

1. A semiconductive polymer composition comprising an olefin homo- or copolymer wherein the composition has a direct current volume resistivity of less than 1000 Ohm·cm at 90° C., an elongation at break which after aging for 240 hours at 135° C. does not change by more than 25%, and a total number of structures of 20 or less in the SIED test.

2. Semiconductive polymer composition according to claim 1 comprising carbon black with an $L_c$ of 1.8 to 2.4 nm.

3. Semiconductive polymer composition according to claim 2, wherein the carbon black has a surface area expressed as iodine number of 75 mg/g or higher.

4. Semiconductive polymer composition according to claim 1 comprising an antioxidant selected from the group of diphenyl amines and diphenyl sulfides.

5. Semiconducting polymer composition according to claim 1, wherein the composition further comprises a compound with polypropylene oxy groups.

6. Semiconducting polymer composition according to claim 4, which comprises furnace carbon black.

7. Semiconductive polymer composition according to claim 1 which comprises carbon black in an amount of 10 to 40 wt. %.

8. Semiconductive polymer composition according to claim 3 which comprises carbon black with surface area expressed as iodine number of 200 mg/g or higher.

9. Semiconductive polymer composition according to claim 8 which comprises carbon black with surface area expressed as iodine number of 300 mg/g or higher.

10. Semiconducting polymer composition according to claim 1, wherein the composition comprises an ethylene homo- or copolymer.

11. Semiconducting polymer composition according to claim 1, wherein the polyolefin comprises monomer units with polar groups or wherein the composition further comprises a polymer with monomer units with polar groups.

12. Semiconducting polymer composition according to claim 11, wherein the polymer with polar monomer units comprises a copolymer of an olefin, with one or more polar comonomers selected from the group of alkyl acrylates, alkyl methacrylates, acrylic acids, methacrylic acids and vinyl acetates.

13. Semiconducting polymer composition according to claim 11, wherein the amount of monomer units with polar groups is from 1 to 15 mol % with regard to the total amount of monomers in the polymeric part of the composition.

14. Semiconducting polymer composition according to claim 10, wherein the polyethylene has a density below 935 $kg/m^3$.

15. Semiconducting polymer composition according to claim 1, wherein the composition has an $MFR_{21}$ of more than 25 g/10 min.

16. Semiconducting polymer composition according to claim 1, with an electrical breakdown strength as measured in the model cable test of at least 29 kV/mm.

17. Semiconducting polymer composition according to claim 1, wherein the composition is crosslinkable.

18. Semiconducting polymer composition according to claim 17, which comprises a peroxide as a crosslinking agent.

19. An electric power cable comprising a conductor, a semiconducting layer and, adjacent to the semiconducting layer, an insulation layer, wherein the semiconducting layer is formed by a composition according to claim 1.

20. Semiconductive polymer composition according to claim 1 which comprises carbon black in an amount of 10 to 30 wt. %.

21. Semiconducting polymer composition according to claim 11, wherein the polymer with polar monomer units comprises a copolymer of an ethylene, with one or more polar comonomers selected from the group of alkyl acrylates, alkyl methacrylates, acrylic acids, methacrylic acids and vinyl acetates.

* * * * *